(12) United States Patent
Chambaud et al.

(10) Patent No.: US 7,938,456 B2
(45) Date of Patent: May 10, 2011

(54) SAFETY QUICK-CONNECT COUPLING FOR ASSEMBLING TWO PIPES

(75) Inventors: Antoine Chambaud, Giez (FR); Alain-Christophe Tiberghien, Sevrier (FR)

(73) Assignee: Staubli Faverges, Faverges (FR)

( * ) Notice: Subject to any disclaimer, the term of this patent is extended or adjusted under 35 U.S.C. 154(b) by 429 days.

(21) Appl. No.: 11/991,647

(22) PCT Filed: Sep. 13, 2006

(86) PCT No.: PCT/FR2006/002096
§ 371 (c)(1),
(2), (4) Date: Mar. 7, 2008

(87) PCT Pub. No.: WO2007/031643
PCT Pub. Date: Mar. 22, 2007

(65) Prior Publication Data
US 2009/0273183 A1    Nov. 5, 2009

(30) Foreign Application Priority Data

Sep. 14, 2005 (FR) .................. 05 09384

(51) Int. Cl.
*F16L 33/16* (2006.01)
*F16L 37/06* (2006.01)
*F16L 37/086* (2006.01)
*F16L 37/12* (2006.01)
*F16L 37/23* (2006.01)
*F16L 37/28* (2006.01)

(52) U.S. Cl. ............... 285/316; 285/1; 285/83; 285/84; 285/85; 285/86; 285/306

(58) Field of Classification Search ............... 285/1, 83, 285/84, 85, 86, 276, 277, 306, 316, 900, 285/924; 251/149.6
See application file for complete search history.

(56) References Cited

U.S. PATENT DOCUMENTS

| 2,297,548 | A | * | 9/1942 | Fox et al. ........... 285/277 |
| 2,377,812 | A | * | 6/1945 | Scheiwer ............ 285/277 |
| 2,461,699 | A | * | 2/1949 | Scheiwer ............ 285/313 |
| 2,784,987 | A | * | 3/1957 | Corcoran ............ 285/82 |
| 2,823,934 | A | * | 2/1958 | Gorrell et al. ........ 285/277 |
| 2,913,263 | A | * | 11/1959 | Zajac ................ 285/277 |

(Continued)

FOREIGN PATENT DOCUMENTS
EP     1298378     4/2003
(Continued)

*Primary Examiner* — James M Hewitt
(74) *Attorney, Agent, or Firm* — Dowell & Dowell, PC (57) ABSTRACT

A quick connect and quick release coupling for connecting two pipes, including a male element and a female element that are axially fitted and interlocked one inside the other and wherein a locking mechanism retains the male element in a coupled position and a temporarily retaining mechanism immobilizes the male element, after its release by the locking mechanism, in a position for flushing a pipe connected to the male element. The locking mechanism is controlled by a sleeve that slides relative to a body of the female element. When the temporarily retaining mechanism retains the male element in flushing position, it is subjected to a first force (E1) derived from a pressure (P) of the fluid flowing (F) from the male element outwards and to a second force (E2), opposite to the first, exerted by elastic return means which, when the pressure (P) drops to a safety threshold, moves the temporarily retaining mechanism into a position for releasing the male element from the female element.

10 Claims, 10 Drawing Sheets

U.S. PATENT DOCUMENTS

| | | | | |
|---|---|---|---|---|
| 3,334,860 A | * | 8/1967 | Bolton, Jr. | 251/149.1 |
| RE27,364 E | * | 5/1972 | German | 251/149.6 |
| 4,148,459 A | * | 4/1979 | Martinez | 251/149.6 |
| 4,366,945 A | | 1/1983 | Blaeuenstein et al. | |
| 5,290,009 A | | 3/1994 | Heilmann et al. | |
| 5,305,984 A | * | 4/1994 | Chen | 251/149.1 |
| 6,131,961 A | * | 10/2000 | Heilmann | 285/316 |
| 6,412,828 B1 | | 7/2002 | Lacroix et al. | |
| 6,568,717 B1 | * | 5/2003 | Le Clinche | 285/315 |
| 2002/0149200 A1 | * | 10/2002 | Fumioka | 285/81 |
| 2004/0094956 A1 | * | 5/2004 | Lacroix et al. | 285/306 |

FOREIGN PATENT DOCUMENTS

EP  1304522 A  4/2003

* cited by examiner

SAFETY QUICK-CONNECT COUPLING FOR ASSEMBLING TWO PIPES

BACKGROUND OF THE INVENTION

1. Field of the Invention

The present invention relates to a quick-action safety coupling for the removable connection of two lines through which a pressurized fluid flows.

2. Brief Description of the Related Art

Such a quick-action coupling conventionally comprises a male element and a female element able to mate with one inside the other. The female element is generally connected to an upstream line and is provided with a shut-off valve that the male element moves to an open position when it is fully inserted into the female element. The male element is generally connected to a downstream line.

From EP-A-1 006 308 it is known to use a transient retention mechanism for retaining the male element in the female element in order to prevent, during disconnection, the male element from being violently expelled out of the female element owing to the residual pressure of the fluid in the downstream line. The transient retention mechanism for retaining the male element in the female element is designed so as to be able to fully release the male element only after it has been temporarily placed in a position in which the downstream line is purged via the coupling.

However, in this known device, disconnecting the coupling requires two manual operations of an external sleeve in order to pass in succession from the mated configuration to the transient retention configuration and then from the transient retention configuration to the disconnected configuration. These successive operations require the operator to wait between the two actions.

SUMMARY OF THE INVENTION

It is this drawback that the invention is more particularly intended to remedy, by proposing a quick-action coupling whereby a single operation by the user is needed to pass from the mated configuration to the retention configuration and then to the disconnected configuration.

For this purpose, the invention relates to a quick-action safety coupling for the removable connection of two lines, namely an upstream line and a downstream line, through which a pressurized fluid flows, this coupling comprising a male element and a female element that are able to mate axially and be locked together, one inside the other, a locking mechanism capable of axially immobilizing the male element in a coupled position, a transient retention mechanism capable of immobilizing the male element, when it is released by the locking mechanism, in a position for purging the line connected to the male element, the locking mechanism being controlled by an operating sleeve sliding along a body of the female element. This coupling is characterized in that when it retains the male element in the purge position, the transient retention mechanism is subjected to a first force due to the pressure of the fluid flowing from the male element to the outside and to a second force, opposing the first force, exerted by elastic return means and tending to displace the mechanism towards a release configuration for releasing the male element, the mechanism being capable of passing from its retention configuration for retaining the male element to its release configuration for releasing the male element depending on the resultant of the abovementioned forces.

Thanks to the invention, the transition from the retention configuration for retaining the male element to the release configuration for releasing the male element automatically occurs as soon as the pressure of the fluid flowing from the male element to the outside reaches a low enough value, corresponding to a safety threshold.

According to other advantageous features of the invention:
- the transient retention mechanism comprises a transient retention ring that can move axially under the effect of the opposing actions of the abovementioned forces, which is capable of limiting a radial and centrifugal displacement of transient latching members that can be engaged in an external peripheral groove of the male element;
- the transient latching members are balls capable of axial and radial movements in slots formed in the body of the female element, said slots being elongate in a direction parallel to the direction of mating of the male element in the female element;
- the transient latching members are claws having a lug, which are capable of pivoting about an axis perpendicular to the axis of mating of the male element in the female element in order to pass from a configuration in which the lug is engaged in the groove of the male element to a configuration in which the lug is disengaged from this groove, and vice versa;
- the operating sleeve forms with the body of the female element at least one chamber for receiving the fluid flowing from the male element to the outside, a part of the transient retention ring forming a movable wall of this chamber;
- the transient retention ring includes, on its internal face, a relief, the axial displacement of the transient retention ring bringing this relief opposite the transient latching members when the male element passes from its mated position to its purge position;
- the relief is disengaged from the transient latching members by the axial displacement of the transient retention ring when the resultant of the abovementioned forces displaces the ring towards the release configuration for releasing the male element;
- the transient retention ring is mounted so as to move with a slight clearance in a sliding space defined between the operating sleeve and the body of the female element;
- the transient retention ring also belongs to the locking mechanism; and
- the transient retention ring is capable, by its axial displacement, of disengaging locking members belonging to the locking mechanism from an external peripheral groove of the male element when the latter passes from its mated position to its purge position.

BRIEF DESCRIPTION OF THE DRAWINGS

The features and advantages of the invention will become apparent in the following description of two embodiments of a quick-action coupling according to the invention, given solely by way of example and with reference to the appended drawings in which.

DESCRIPTION OF THE PREFERRED EMBODIMENTS

Figure 1:
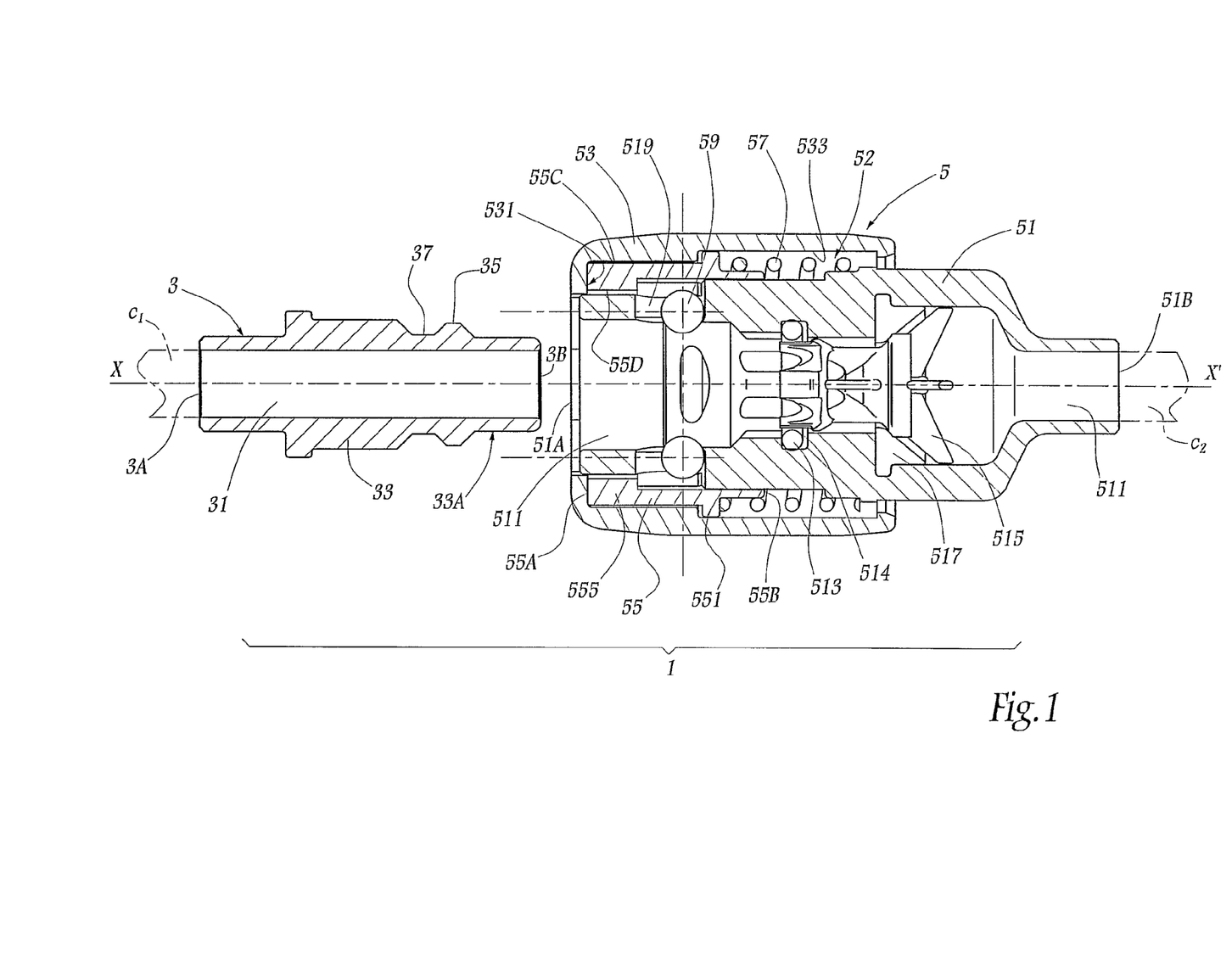
FIG. 1 is an axial section showing the general arrangement of the male and female elements of a coupling according to the invention in a configuration in which these elements are separated.

FIG. 1 shows schematically the elements of a coupling 1 intended for connecting two lines $C_1$ and $C_2$ through which a pressurized fluid flows. The coupling 1 comprises a male element 3 and a female element 5, both being of overall tubular shape and mutually complementary.

Passing right through the male element 3 is an axial passage 31 for the pressurized fluid, said passage opening at the two ends 3A and 3B of the male element 3. The line $C_1$, located downstream of the coupling 1 and shown schematically by the dot-dash lines in the figures, is connected to the passage 31 at the rear end 3A of the male element 3. Near its front end 3B, the male element 3 has a plug-shaped end portion 33 provided with an annular collar 35 behind which an external peripheral groove 37 is formed.

Figure 2:
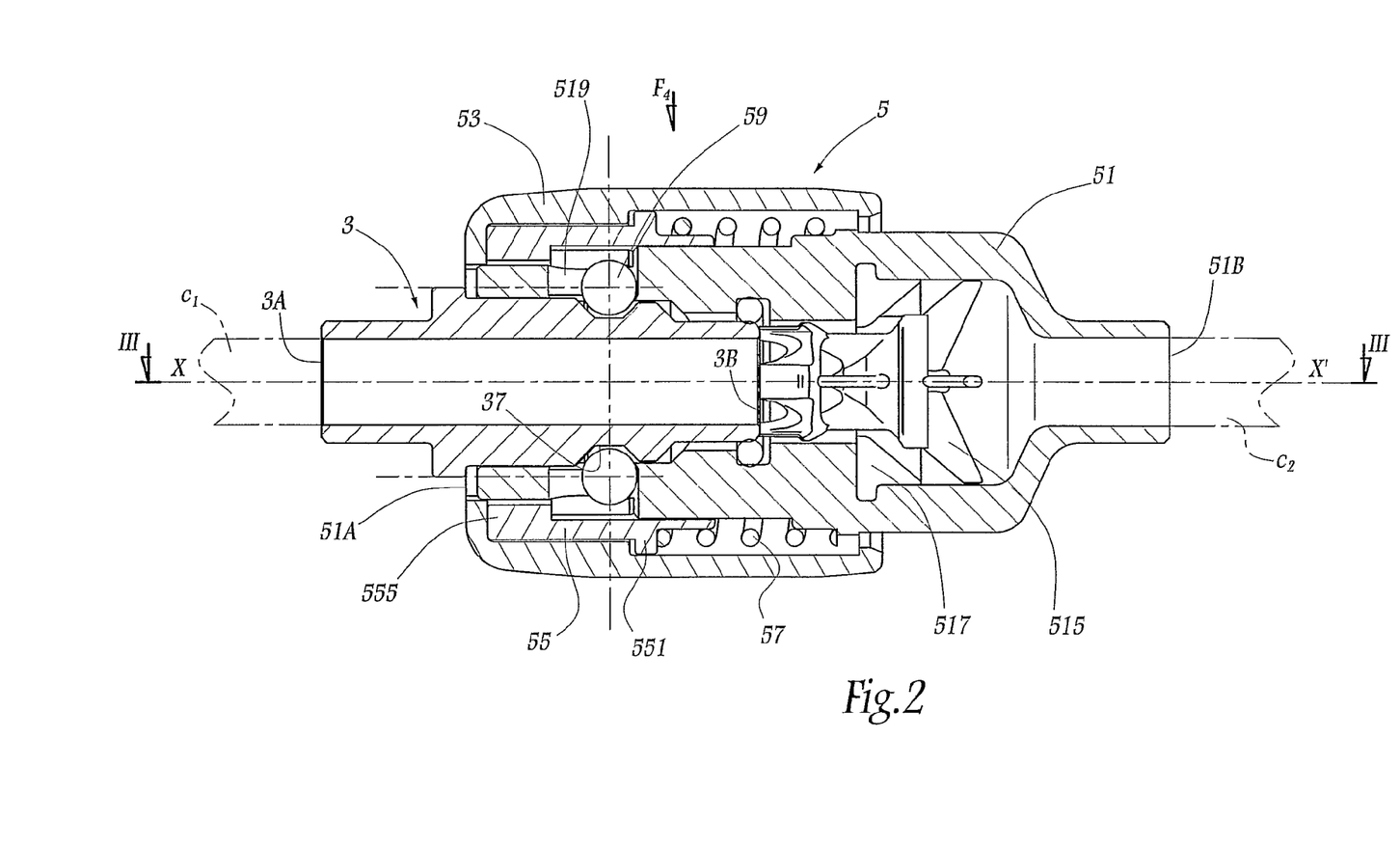
FIG. 2 is a section similar to FIG. 1, in the mated configuration of the coupling.
Figure 3:
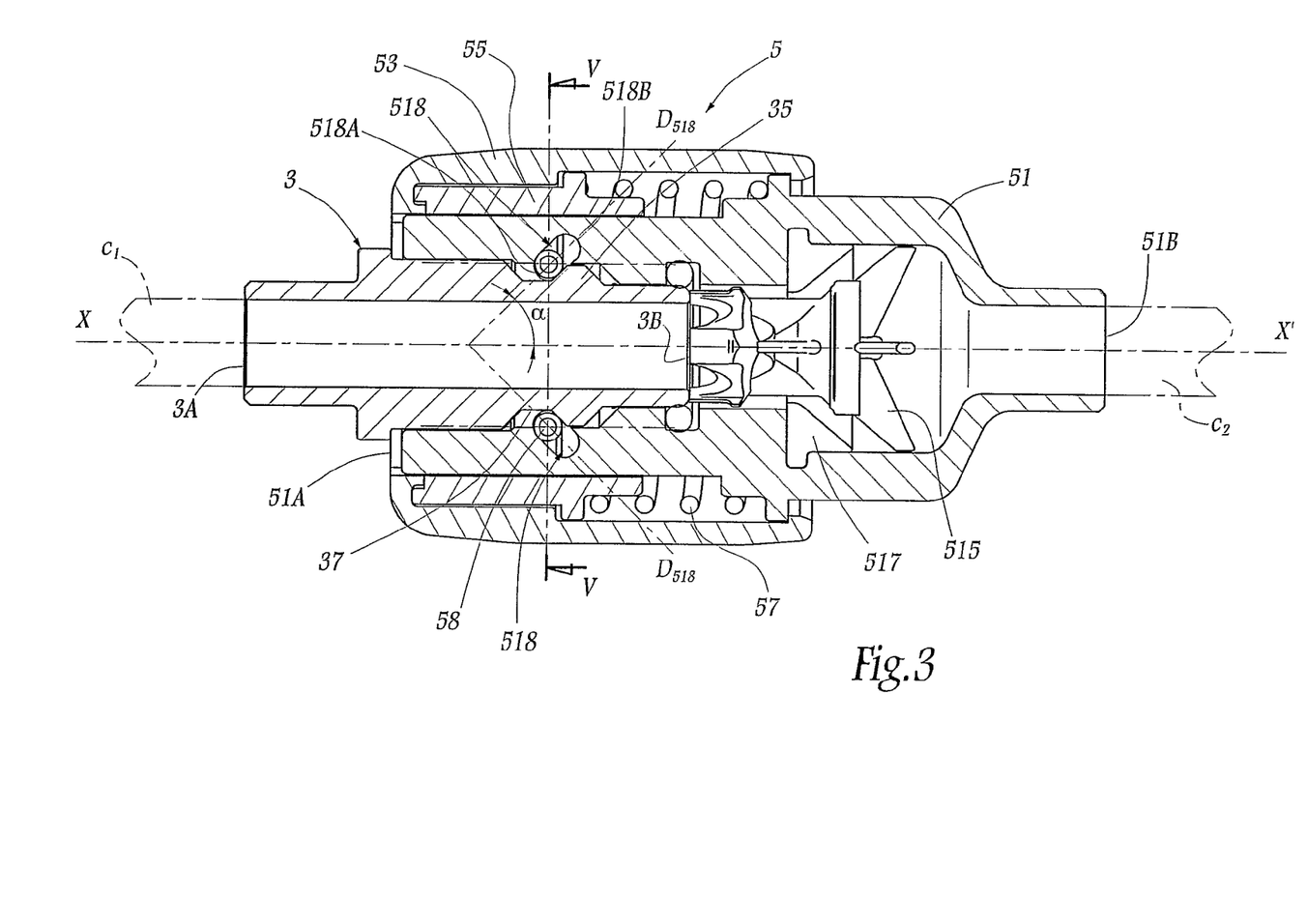
FIG. 3 is an axial section on the line III-III of FIG. 2.
Figure 4:
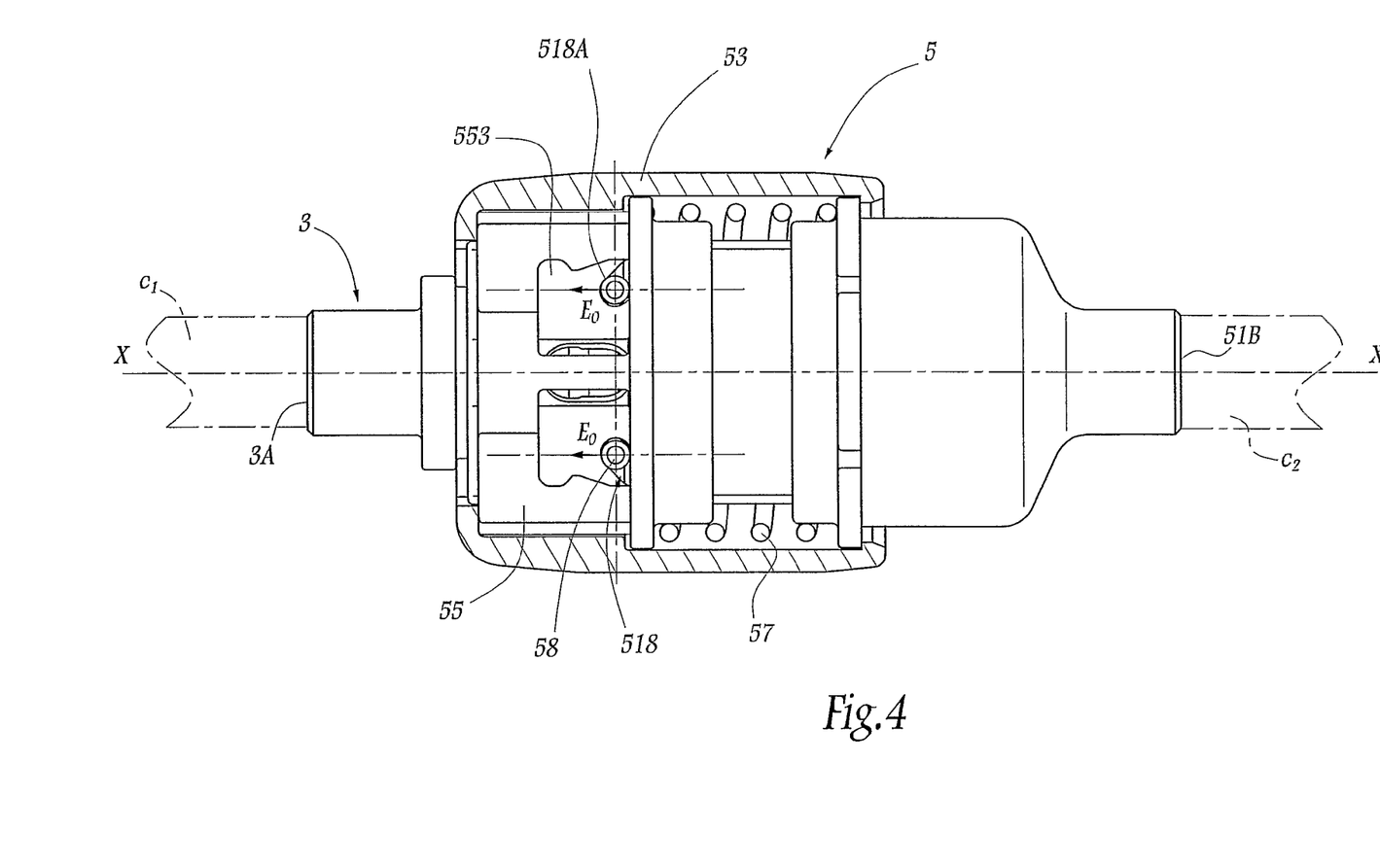
FIG. 4 is a side view of the coupling of FIGS. 1 to 3, along the direction of the arrow $F_4$ in FIG. 2, the sleeve of the coupling being shown in cross section.
Figure 5:
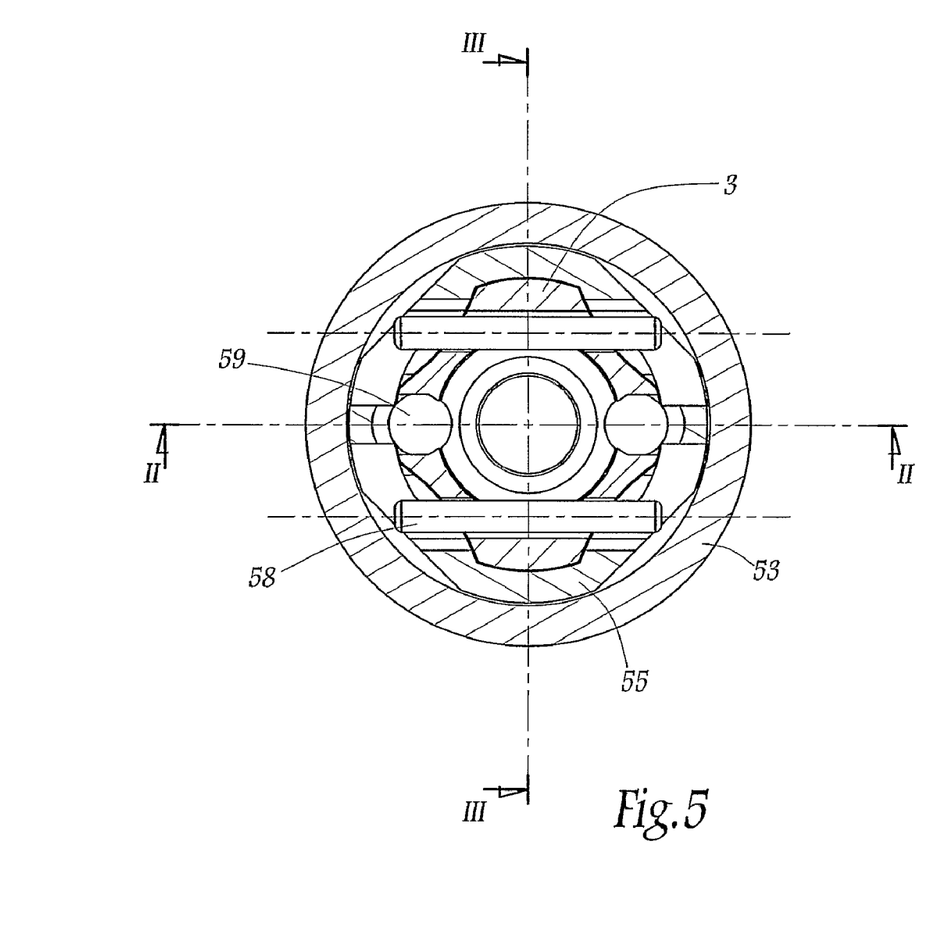
FIG. 5 is a cross section on the line V-V of FIG. 3, showing, at II-II and III-III, the planes of section of FIGS. 2 and 3.

The female element 5 comprises a body 51 right through which passes an axial passage 511 centred on an axis X-X' and emerging at the two ends 51A and 51B of the body 51. The line $C_2$, located upstream of the coupling 1 and shown schematically by the dot-dash lines in the figures, is connected to the passage 511 at the rear end 51B of the body 51. An O-ring 513, intended to seal the connection of the passages 31 and 511 in the mated configuration of the coupling, is mounted in an annular groove 514 provided in the body 51. The O-ring 513 bears against the external radial surface 33A of the plug 33 when the element 3 is mated with the element 5, as shown in FIGS. 3 and 5. A shut-off valve 515 is mounted so as to slide in the passage 511, being able to move between an open position and a closed position. In the closed position shown in FIG. 1, the valve 515 is applied against a seat 517 provided in the passage 511. In the open position illustrated in FIGS. 2 and 3, the valve 515 is away from the seat 517.

The female element also includes an operating sleeve 53 placed around the body 51 and capable of translational movement along this body, parallel to the X-X' axis. A ring 55 is mounted so as to slide in a space 52 bounded between the sleeve 53 and the body 51. The ring 55 can move axially parallel to the X-X' axis. When the female element 5 is separated from the male element 3, as shown in FIG. 1, the end face 55A of the ring 55 turned towards the end 51A of the body 51 bears against an internal shoulder 531 of the sleeve 53. The ring 55 includes, on its external face 55C turned towards the sleeve 53, a collar 551 which is subjected to the action of a compression spring 57 that tends to push it back towards the end 51A of the body 51 and towards the shoulder 531. The collar 551 can move in an internal annular groove 533 of the sleeve 53. On its internal face 55D turned towards the central axis X-X', the ring 55 includes, near its end face 55A, an internal collar 555 projecting towards the X-X' axis.

Two needles 58 are provided in order to lock the male element 3 inside the body 51 of the female element 5 in the mated configuration shown in FIGS. 2 to 5. The needles 58 can move inside two oblong slots 518 made in the body 51 of the female element and inclined relative to the X-X' axis. The slots 518 each extend along a direction $D_{518}$, which makes an acute angle α of about 45° with the X-X' axis. Moreover, two transient latching balls 59 are housed in two oblong slots 519 made in the body 51 of the female element, parallel to the X-X' axis.

In FIG. 1, the female element 5 and the male element 3 are shown separated. The valve 515 can slide freely and the pressure of the fluid in the upstream line $C_2$ pushes it into its shut-off position. In addition, the spring 57 pushes the ring 55 against the shoulder 531 of the sleeve 53.

When the male element 3 is inserted into the body 51, the collar 35 pushes back the needles 58 radially towards the end 518B of the slots 518 that is furthest away from the X-X' axis. This makes the ring 55 move back against the spring 57. At the same time, the balls 59 are pushed back radially in the slots 519 by the collar 35. Once the collar 35 has been passed, the needles 58 can move towards the end 518A of the slots 518 that is closest to the X-X' axis owing to a thrust force $E_0$ exerted on the needles 58 by the ring 55 subjected to the action of the spring 57. The needles 58 are then engaged in the groove 37 of the male element 3. The needles 58 are held in place at the end 518A of the slots 518 by the collar 551 of the ring 55, which exerts the force $E_0$ on them. Likewise, the balls 59 are able to be moved radially and engage in the external peripheral groove 37 of the male element 3 after passing the collar 35. The mated configuration shown in FIGS. 2 to 5 is then reached.

Figure 6:
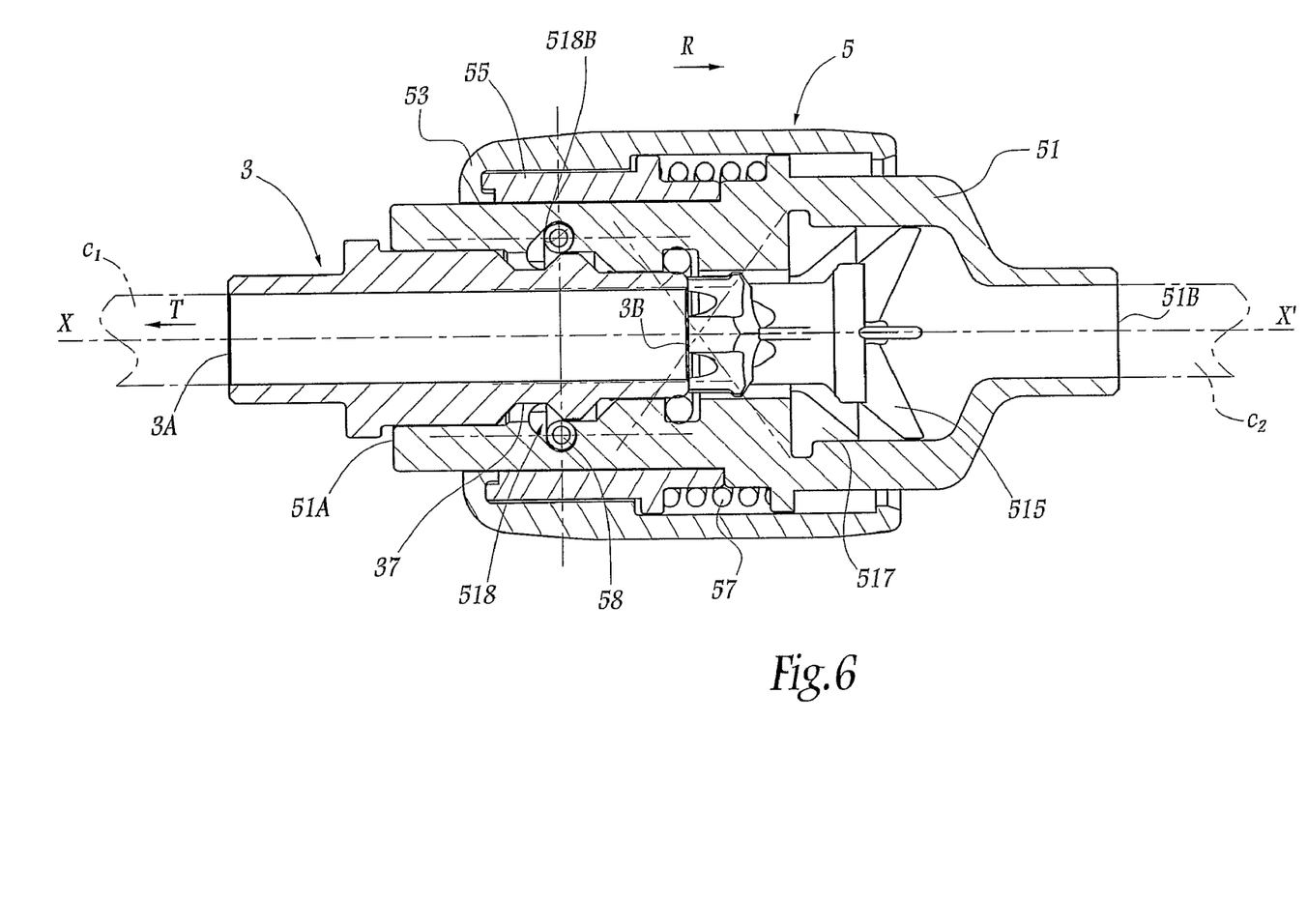
FIG. 6 is an axial section similar to FIG. 3, showing the coupling in an intermediate configuration between the mated configuration and the retention configuration.
Figure 7:
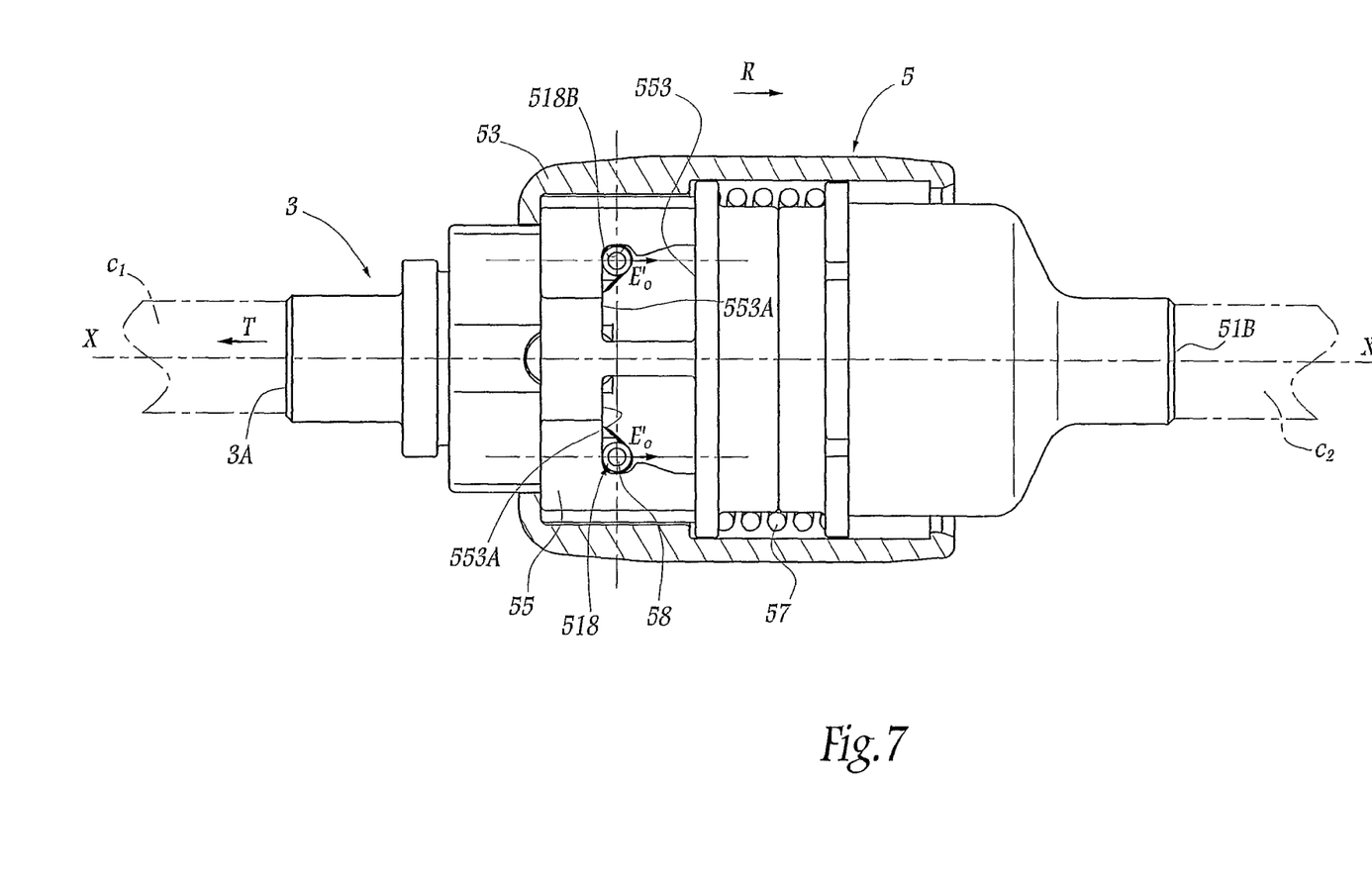
FIG. 7 is a view similar to FIG. 4, showing the coupling in the configuration of FIG. 6.
Figure 8:
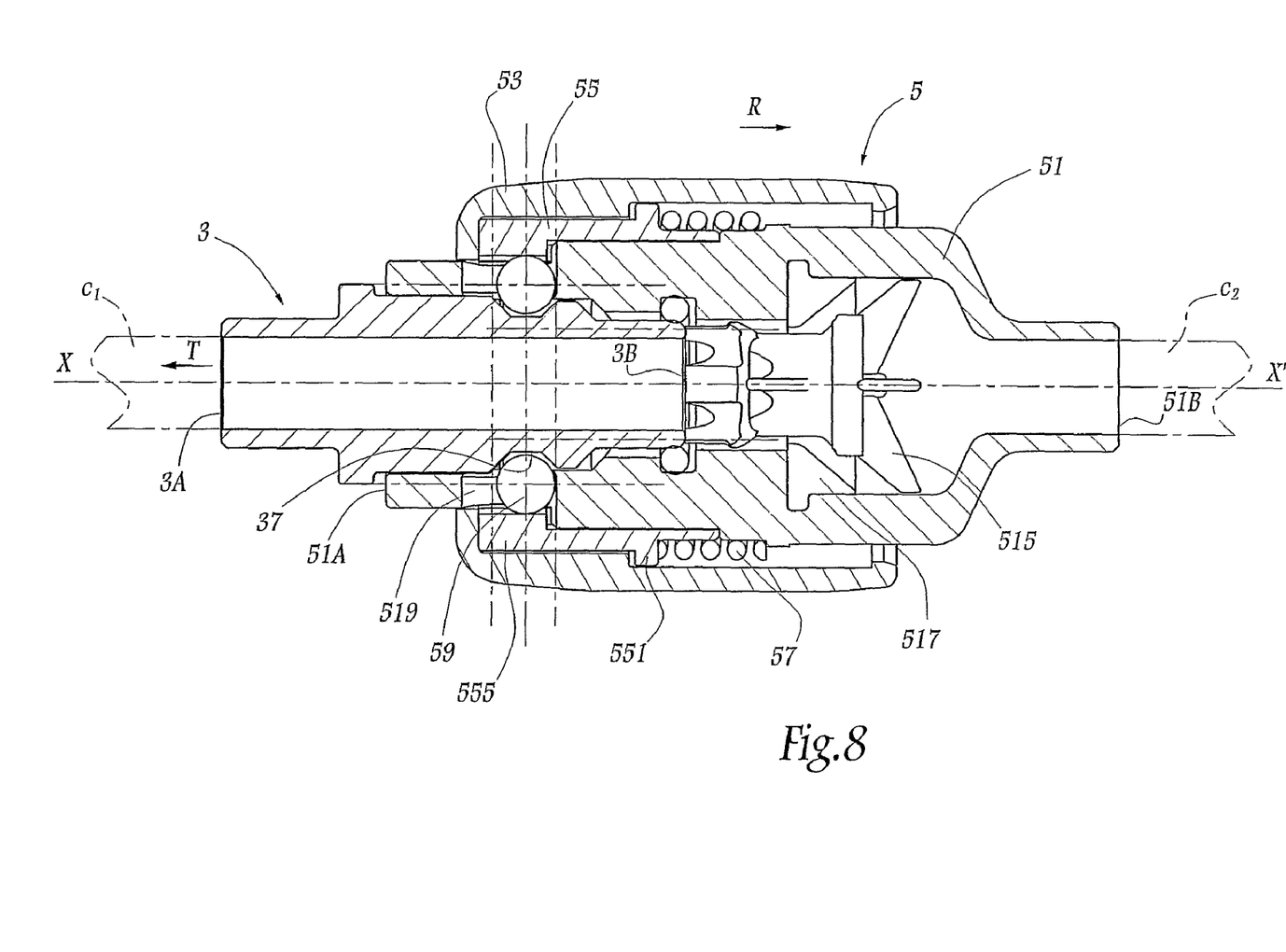
FIG. 8 is an axial section similar to FIG. 2, showing the coupling in the configuration of FIGS. 6 and 7.

When it is necessary to open the coupling 1, that is to say to separate the male and female elements 3 and 5, the male element 3 is unlocked from the body 51 by exerting a retraction force R on the sleeve 53, said force being directed towards the rear of the female element 5, i.e. towards the line $C_2$, as shown in FIGS. 6 to 8. The sleeve 53 bears against the ring 55 via the shoulder 531 and the face 55A in such a way that the displacement of the sleeve 53 towards the line $C_2$ results in a concomitant displacement of the ring 55 in the same direction. The internal collar 555 then covers the balls 59 and prevents any radial movement of these balls towards the outside of the groove 37.

The ring 55 also includes housings 553 in which the needles 58 are engaged. Because of the movement of the ring 55, the edges 553A of the housings 553 push the needles 58 back towards the line $C_2$, exerting a force $E'_0$ directed towards the rear of the element 5. This has the effect of pushing each of the needles 58 towards the end 518B of the corresponding slot 518. Owing to the inclination of the slots 518, the needles 58 are thus extracted from the groove 37, in such a way that the male element 3 can be slightly expelled towards the outside of the body 51, with a translational movement represented by the arrow T in FIGS. 6 to 8.

The end 3B of the male element 3 therefore no longer bears against the valve 515. The valve 515 is therefore pressed against the seat 517 under the effect of the pressure in the line $C_2$.

In the position shown in FIGS. 6 to 9, the male element 3 is retained inside the body 51 by the balls 59 which are held in the groove 37 by the collar 555.

Figure 9:
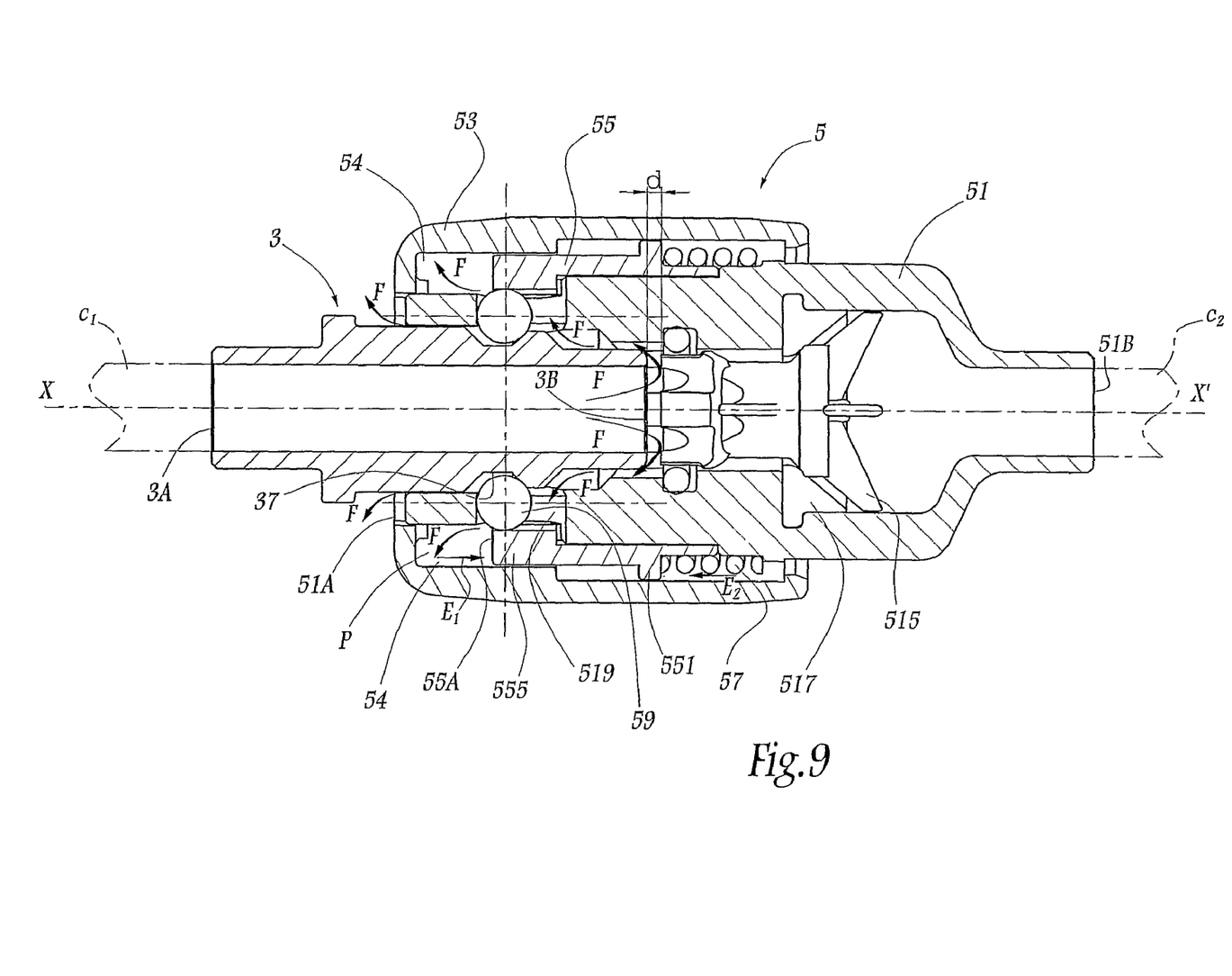
FIG. 9 is an axial section similar to FIG. 8, showing the coupling in the retention configuration.

By passing from the mated position shown in FIGS. 2 to 5 to the retention configuration shown in FIG. 9, the male element 3 reaches a position in which the fluid contained in the line $C_1$ is purged, since the end 3B of the male element 3 is separated from the valve 515 by a non-zero distance d. The arrows F in FIG. 9 show the flow of the fluid from the male element 3 towards the outside.

In the retention configuration shown in FIG. 9, the fluid escapes from the male element 3 into a fluid-receiving chamber 54 provided between the sleeve 53 and the body 51, the end 55A of the ring 55 forming a movable wall of the chamber 54. Thus, the ring 55 is subjected to the opposing actions of the force $E_1$, due to the pressure P in the chamber 54 of the fluid flowing from the male element 3, which tends to move the ring 55 towards the end 51B of the body 51, and the elastic return force $E_2$ of the spring 57, which tends to move the ring 55 towards the end 51A of the body 51. At the same time, the pressure P in the chamber 54 moves the sleeve 53 back towards the end 51A. When the pressure P in the chamber 54 drops because the fluid flows to the outside through the interstices forming the gaps needed to operate the coupling, the force $E_2$ becomes greater than the force $E_1$ and the resultant of the forces $E_1$ and $E_2$ pushes the ring 55 towards the end 51A of the body 51. Thus, the collar 555 is disengaged from the balls 59. The balls 59 can then move radially in the slots 519 and be disengaged from the groove 37. When the balls 59 are extracted from the groove 37, and since the needles 58 are already upstream of the collar 35, nothing prevents the male element 3 from being extracted from the body 51. The coupling can then pass to the disconnected configuration shown in FIG. 1.

Thus, a single action R on the sleeve 53 allows the locking needles 58 to be disengaged, the transient retention balls 59 being covered by the ring 55, which is held in this position by the purge pressure P against the spring 57 as long as this pressure is sufficient for the force $E_1$ to oppose the force $E_2$. When the pressure P reaches a safety threshold that depends on the stiffness constant of the spring 57 and may be chosen by the designer of the coupling 1, the spring 57 pushes back the ring 55 and the balls 59 release the male element 3.

A coupling according to the invention is therefore a compact and single-action coupling that is simple to use and can be adapted to most male end-fittings on the market. In addition, the duration of the purge is automatically matched to the amount of fluid to be removed, unlike in dual-action couplings. The invention therefore makes it possible to save time and to improve safety.

Figure 10:
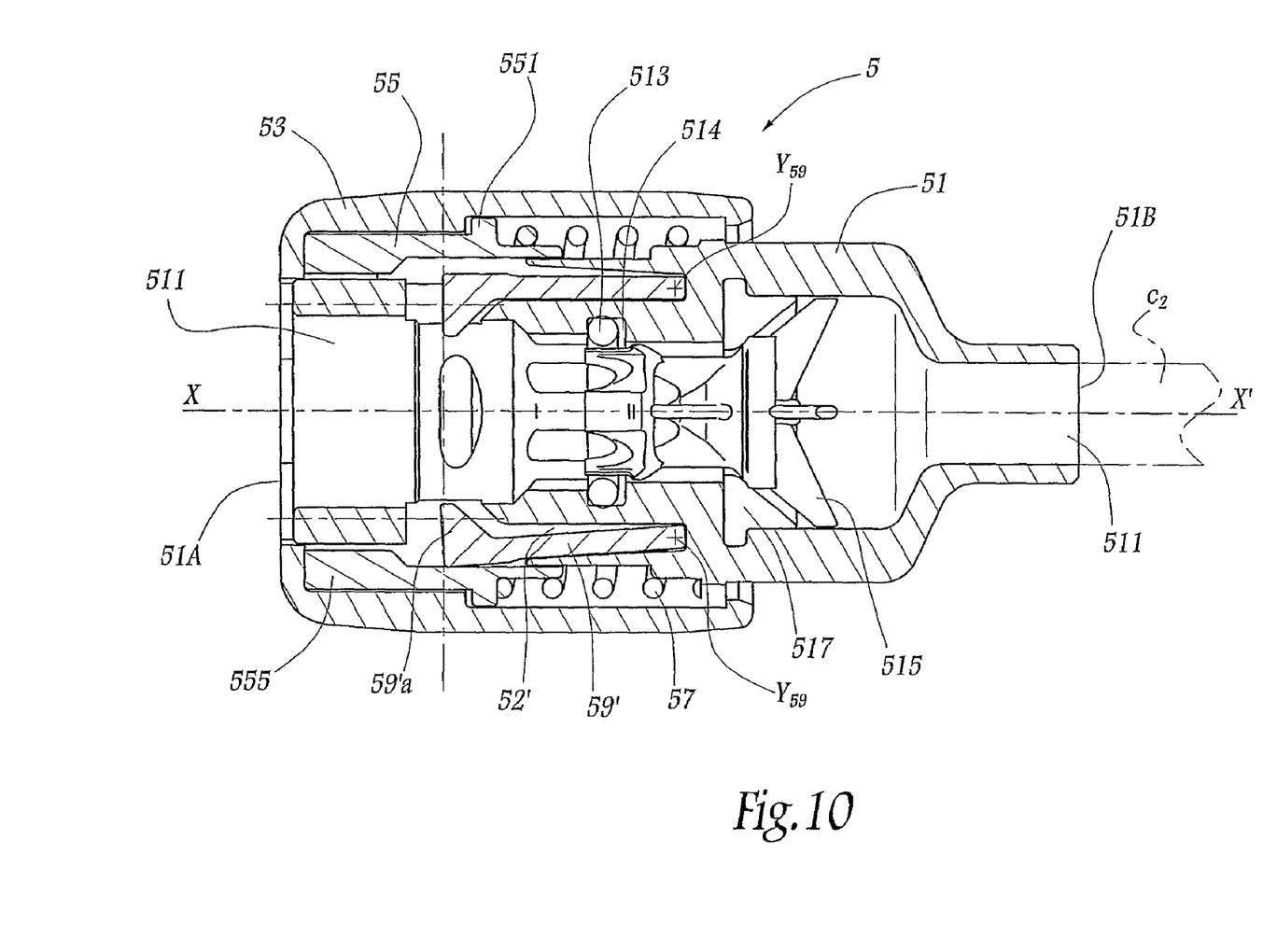
FIG. 10 is an axial section similar to FIG. 1, showing the female element of a coupling according to a second embodiment of the invention in the configuration in which it is separated from the corresponding male element.

In the second embodiment shown in FIG. 10, the elements similar to those of the first embodiment are indicated by identical references. Temporary latching balls 59 have been replaced with claws 59', each having a lug 59'a capable of engaging in the external peripheral groove 37 of the male element 3. The claws 59' are mounted in a recess 52' of the body 51, each pivoting about an axis $Y_{59}$ perpendicular to the X-X' axis. Upon passing from the mated configuration to the retention configuration, the axial displacement of the ring 55 brings its collar 555 into contact with the lugs 59'a of the claws 59'. Thus, any radial movement of the claws 59' towards the outside of the groove 37 is prevented, thereby keeping the male element 3 in the body 51. When the pressure P of the fluid being purged becomes low enough, the spring 57 pushes the ring 55 back towards the end 51A of the body 51. The collar 555 is then offset relative to the lugs 59'a of the claws 59'. The claws 59' can then move radially so as to be disengaged from the groove 37 and to release the male element 3 from the body 51.

In the two embodiments described, the locking members are needles. However, other locking members may be envisaged, especially balls or claws.

The invention claimed is:

1. Quick action safety coupling for the removable connection of an upstream line and a downstream line through which a pressurized fluid flows, the coupling comprising a male element and a female element that mate axially and are locked together one inside the other, a locking mechanism that axially retains the male element in a coupled position, a transient retention mechanism capable of maintaining the male element, when it is released by the locking mechanism, in a position for purging the line connected to the male element, the locking mechanism being controlled by an operating sleeve sliding along a body of the female element, the transient retention mechanism being structured such that when the retention mechanism maintains the male element in the purge position, the transient retention mechanism is subjected to a first force ($E_1$) due to the pressure (P) of the fluid (F) flowing from the male element to the outside and to a second force ($E_2$), opposing the first force, exerted by elastic return means and tending to displace said mechanism towards a release configuration for releasing the male element from the female element, and the transient retention mechanism automatically passing from its retention configuration for retaining the male element within the female element to its release configuration for releasing the male element from the female element depending on a resultant of the forces ($E_1$, $E_2$).

2. Quick action coupling according to claim 1, wherein the transient retention mechanism includes a transient retention ring that moves axially under the effect of the opposing actions of the forces ($E_1$, $E_2$) and which limits a radial and centrifugal displacement of transient latching members that are engageable in an external peripheral groove of the male element.

3. Quick action coupling according to claim 2, wherein the transient latching members are balls that move axially and radially in slots formed in the body of the female element, the slots being elongate in a direction parallel to the direction of mating (X-X') of the male element in the female element.

4. Quick action coupling according to claim 2, wherein the transient latching members are claws having a lug which pivot about an axis ($Y_{59}$) perpendicular to the axis of mating (X-X') of the male element in the female element in order to pass from a configuration in which the lug is engaged in the groove of the male element to a configuration in which the lug is disengaged from the groove, and vice versa.

5. Quick action coupling according to claim 2, wherein the operating sleeve forms with the body of the female element at least one chamber for receiving the fluid flowing from the male element to the outside, a part of the transient retention ring forming a movable wall of the chamber.

6. Quick action coupling according to claim 2, wherein the transient retention ring includes, on an internal face thereof, a relief, the axial displacement of the transient retention ring bringing the relief opposite the transient latching members when the male element passes from its mated locked position to its purge position.

7. Quick action coupling according to claim 6, wherein the relief is disengaged from the transient latching members by the axial displacement of the transient retention ring when the resultant of the forces ($E_1$, $E_2$) displaces the ring towards the release configuration for releasing the male element.

8. Quick action coupling according to claim 2, wherein the transient retention ring is mounted so as to move with a slight clearance in a sliding space defined between the operating sleeve and the body of the female element.

9. Quick action coupling according to claim 2, wherein the transient retention ring forms a part of the locking mechanism.

10. Quick action coupling according to claim 8, wherein the transient retention ring is capable, by its axial displacement, of disengaging locking members belonging to the locking mechanism from an external peripheral groove of the male element when the male element passes from its mated locked position to its purge position.

* * * * *